United States Patent [19]
Niazy

[11] Patent Number: 6,103,328
[45] Date of Patent: *Aug. 15, 2000

[54] DECORATIVE FILMS AND LAMINATED FORMABLE SHEETS WITH DUAL PROTECTIVE FILM LAYERS

[75] Inventor: R. Richard Niazy, Clarkston, Mich.

[73] Assignee: Android Industries of Michigan LLC, Whitmore Lake, Mich.

[*] Notice: This patent is subject to a terminal disclaimer.

[21] Appl. No.: 09/307,509

[22] Filed: May 7, 1999

Related U.S. Application Data

[63] Continuation-in-part of application No. 08/856,553, May 15, 1997, Pat. No. 5,919,537.
[60] Provisional application No. 60/020,448, Jun. 18, 1996.

[51] Int. Cl.$^7$ .......................................................... B32B 9/00
[52] U.S. Cl. ...................... 428/40.1; 428/41.6; 428/41.7; 428/41.8; 428/76; 428/480
[58] Field of Search ................................... 428/41.7, 213, 428/41.6, 76, 204, 68, 42.2, 41.8, 40.1, 480; 264/132, 510, 544; 156/247, 243, 60

[56] References Cited

U.S. PATENT DOCUMENTS

| | | | |
|---|---|---|---|
| 4,824,506 | 4/1989 | Hoerner | 156/245 |
| 4,902,557 | 2/1990 | Rohrbacher | 428/215 |
| 4,913,760 | 4/1990 | Benson et al. | 156/244.11 |
| 4,921,556 | 5/1990 | Hakiel | 156/164 |
| 4,960,558 | 10/1990 | Short | 264/510 |
| 5,215,826 | 6/1993 | Shimanski et al. | 428/483 |

*Primary Examiner*—Deborah Jones
*Assistant Examiner*—Abraham Bahta
*Attorney, Agent, or Firm*—Rader, Fishman & Grauer PLLC

[57] ABSTRACT

A decorative film, such as a film of pigmented paint or a colored thermoplastic layer covered by a film of clear coat, has the outer (clear coat) surface protected by a removably fixed thermoformable first protective film layer. A flexible plastic film forming a second protective layer is removably fixed to the first layer. The underlying decorative film may be laminated to a thin wall or thick wall thermoplastic formable sheet. The second protective layer is removed just prior to forming of the laminated decorative sheet, carrying with the protective film any surface damage marks or irregularities. Subsequent compression forming, as into a body panel or trim part, thus will not cause marking of the decorative film from transfer of damage marks since the underlying first protective layer remains undamaged. The first protective layer may remain in place during assembly of the formed body panel or trim part into a vehicle, and thereafter until delivery of the vehicle by a dealer to a customer. The second layer may act as a carrier for the films and is stripped from the first protective layer before forming, so it may be made from non-formable material such as PET polyester.

14 Claims, 2 Drawing Sheets

DECORATIVE FILMS AND LAMINATED FORMABLE SHEETS WITH DUAL PROTECTIVE FILM LAYERS

CROSS REFERENCE TO RELATED APPLICATIONS

This application is a continuation-in-part of application Ser. No. 08/856,553 filed on May 15, 1997 is now U.S. Pat. No. 5,919,537, and which claims the benefit of U.S. Provisional Application No. 60/020,448 Jun. 18, 1996.

FIELD OF THE INVENTION

This invention relates to laminated decorative films having removable protective layers and to formable plastic sheets laminated with such decorative films and formable into body panels or trim components, such as for automotive vehicle bodies and other suitable purposes.

BACKGROUND OF THE INVENTION

It is known in the art to provide formable decorative films of paint, and other materials such as clear coat, wood grain, ink, chromium, and other metals for use in forming the exterior surfaces of automotive vehicle panels. Presently, paint films are available having an under layer of pigmented paint with one or more over layers of clear coat, the multiple layers together having a thickness of about 0.0015 inches more or less as desired. The paint layers are supported by a carrier in the form of a non-formable plastic film, such as "MYLAR" PET, polyethylene terephthalate polyester film, with a thickness of about 0.002 inches. Such a film, upon removal of the non-formable carrier layer, may be shaped by vacuum forming to a prescribed exterior configuration and then placed in a mold for injection molding of a substrate against the pigmented color coat layer of paint to form a plastic body panel or trim component of a desired shape. The injection molded panel is subsequently trimmed. The clear coat painted surface then forms the decorative exterior of the formed component.

To stiffen the decorative film for handling between formation of the film and injection molding or other processing, the carrier supported film may be laminated to a thin formable sheet of TPO, thermoplastic polyolefin, commonly 6 mil to 20 mil thickness (0.006 to 0.020 inches). The TPO is laminated to the color coat side of the decorative film, which is opposite from the PET carrier layer prior to its removal.

If desired the clear coat side of the decorative film may be protected from damage after removal of the non-formable carrier layer by applying, in any suitable manner, a removable protective film layer of thermoformable, stretchable, plastic material of suitable thickness, such as about 0.002 inches. This layer may remain in place during the subsequent forming process and thereafter as long as desired prior to removal, even up to the time of delivery of the product to an ultimate customer.

In accordance with a commonly assigned copending U.S. patent application Ser. No. 08/788,131, filed Jan. 24, 1997, the multi-layer film, with or without the thin sheet of TPO, may be laminated to a thick wall thermoplastic sheet of TPO (0.065–0.3 inches thick). The resulting decorative sheet may be compression formed, or compression/vacuum formed, to make a structural or trim panel or component for vehicle bodies or other uses.

SUMMARY OF THE INVENTION

In processes for compression forming of laminated decorative sheets, damage to decorative film layers sometimes occurs even though the film layers are protected by a removable and formable first protective layer. If the surface of the first protective layer is scratched or otherwise damaged in handling, a subsequent compression forming step may transfer marks from the damaged surface of the first protective layer onto the underlying clear coat and other decorative film layers. Thereafter, removal of the protective layer reveals a marked decorative film surface that fails to meet specifications for automotive finishes.

The present invention provides a solution to this problem by applying a second protective layer of flexible plastic film over the first protective layer to protect it from damage during handling prior to the forming process. The second layer is removed just prior to compression forming, taking with it any scratches or damage. Thus, compression forming takes place with a clean and undamaged surface and the underlying protective and decorative film layers are unmarked by the forming process. The second protective layer may be made of either formable or non-formable flexible material since it is removed before forming. This second layer may also be used as a carrier for forming paint films. In that case, the first protective layer would be applied to the second layer with the clear and color coats applied thereafter.

In a particular example, a carrier film, such as MYLAR of about 0.002 inches thickness is laid down, to which a removable protective film layer of formable plastic is laminated followed by layers of clear coat and color coat, together forming a two layer paint application of about 0.005 inches. This four layer film may be made into rolls for shipping or storing until subsequent use.

In use, the laminated decorative film layer may be applied according to the invention, to a thermoplastic thick wall plastic sheet for use in novel methods of forming such laminated decorative sheets into body panels or trim components for vehicles or into other products for other uses in accordance with co-pending U.S. patent application Ser. No. 08/788,131, assigned to the assignee of the present invention. Each of these thick wall formable laminated sheets may have thickness in the range from 0.065–0.3 or more inches.

Before such forming, the carrier, or MYLAR second protective film layer, remains in place to protect the lower layers against damage during handling prior to processing. This MYLAR layer is then removed prior to processing as it is not capable of being formed to provide a characterized high quality exterior surface. The first protective layer, which is made of a formable plastic film, remains in place during processing of the thick wall plastic sheet into a panel or other component having the decorative film layer in place. This first layer then protects the underlying paint layers or other decorative layers during shipping and handling of the panel and subsequent installation of the panel. The protective layer may then be removed or, preferably, remains in place while the vehicle or other product is shipped to a dealer and is finally removed only at the time the vehicle or product is sold and the dealer prepares the vehicle or product for delivery to a customer. Thus the decorative film layer, applied to a thick wall plastic sheet subsequently formed into a panel or trim component, is protected both during shipment as well as during later forming processes and thereafter, if desired, for assembly into a vehicle of other product and until delivery to a customer.

In accordance with the invention, decorative films protected with first and second protective layers as described may also be applied to thin wall formable plastic sheets for use in various forming processes. Optionally, the thin wall laminated sheets may be bonded to thick wall sheets as described above to form thick wall decorative sheets usable in the manner before described.

In accordance with another aspect of the invention, decorative film products protected with the first and second protective layers include a multi-layer sheet of thermoformable decorative material that forms an exterior finish of a panel or trim component. In one implementation, the multi-layer sheet includes a clear thermoplastic layer bonded to a colored thermoplastic substrate. In another implementation, the multi-layer sheet includes a thermoplastic color carrier layer sandwiched between a clear thermoplastic layer and a thermoplastic substrate. In either case, the first protective layer, which is a thermoformable plastic film, is removably fixed to the clear thermoplastic layer, and helps prevent damage to the decorative material prior to and during subsequent forming operations. The second protective layer, which is a flexible plastic film, is removably fixed to the first protective layer, and helps prevent damage to the first protective layer prior to forming operations.

These and other features and advantages of the invention will be more fully understood from the following description of certain exemplary embodiments of the invention taken together with the accompanying drawings.

BRIEF DESCRIPTION OF THE DRAWINGS In the drawings.

Figure 1:
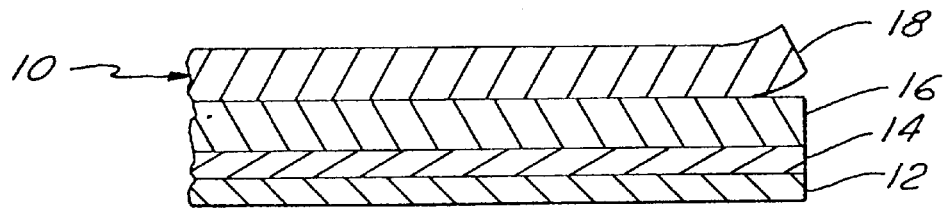
FIG. 1 is a fragmentary cross-sectional view of a thermoformable laminated decorative paint film having dual protective film layers in accordance with the invention.
Figure 4:
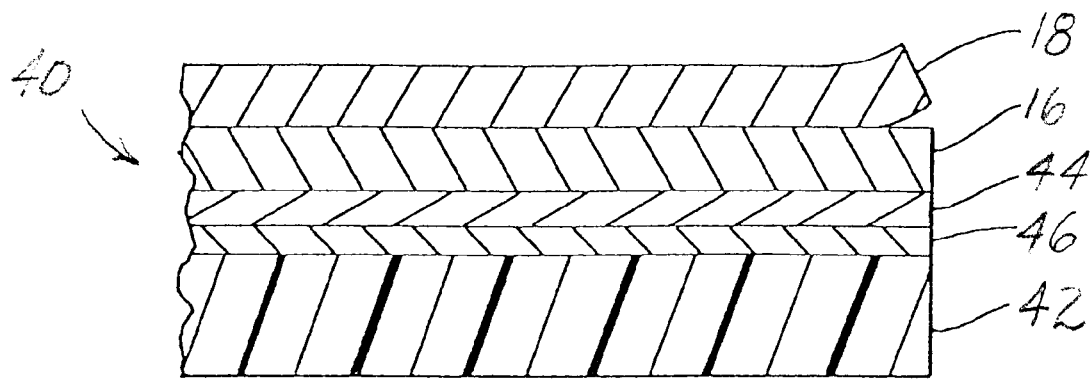
Figure 5:
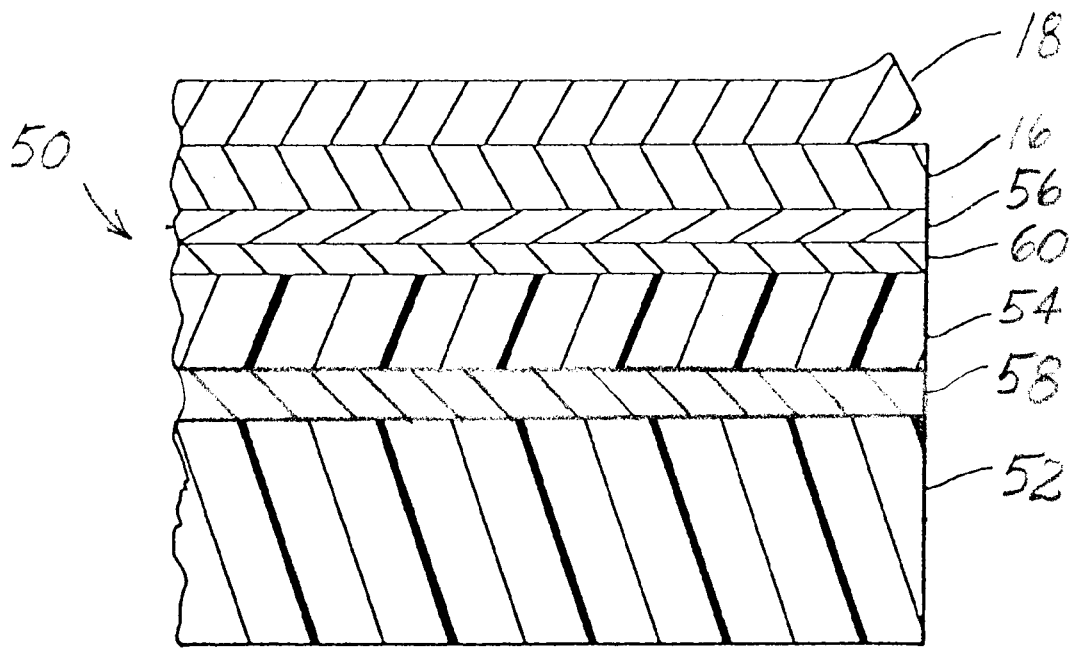

FIG. 4 is a cross-sectional view wherein the protective film layers of FIG. 1 are shown laminated to a colored thermoplastic substrate bonded or laminated to a clear thermoplastic outer layer; and FIG. 5 is a cross-sectional view wherein the protective film layers of FIG. 1 are shown laminated to a multi-layer sheet comprise of a thermoplastic clear outer layer, thermoplastic color carrier layer, and a thermoplastic substrate.

DETAILED DESCRIPTION OF THE INVENTION

Referring first to FIG. 1 of the drawings in detail, there is shown a laminated decorative film product generally indicated by numeral 10. Film product 10 includes one or more layers of thermoformable material including, in the present instance, a first layer 12 of pigmented paint and a second layer 14 of clear coat. Other film layers, such as ink, chromium, etc., could be substituted for the pigmented paint layer and the clear coat could have multiple layers or be omitted if desired.

Removably fixed, as by laminating, to the clear coat (outer) layer is a first protective layer 16 of thermoformable plastic film. To this film is removably fixed a second protective layer 18 of flexible plastic film. Film 18 may also be thermoformable but it may instead be a non-formable film, such as polyethylene terephthalate (PET) polyester, and may act as a carrier layer on which the other film layers are built up or formed.

In use, the carrier layer 18 protects the underlying films during shipping and handling. However, this second protective layer 18 is removed, stripped off, from the first protective layer 16 prior to forming of the remaining film layers into a desired three dimensional shape for further processing, such as injection molding to a heavier substrate.

Figure 2:
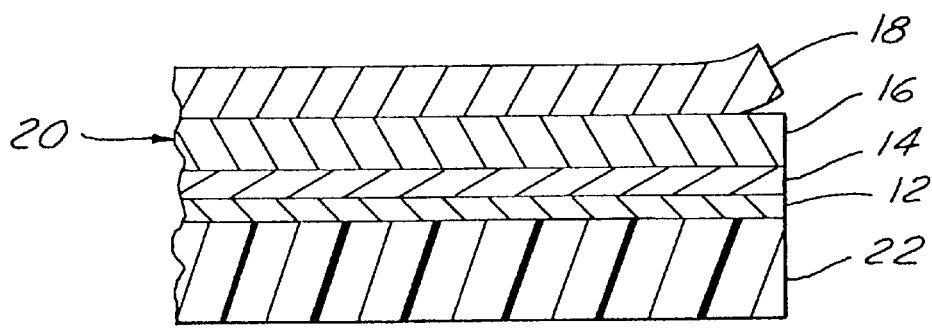
FIG. 2 is a cross-sectional view wherein the protected film of FIG. 1 is shown laminated to a thin wall thermoplastic sheet.

FIG. 2 illustrates another use of the film product of FIG. 1 to form a thin wall decorative sheet generally indicated by numeral 20. Sheet 20 includes the layers 12, 14, 16, 18 of film product 10 laminated on the side of the paint film 12 to a thin wall thermoplastic sheet 22. This stiffens the product 20 for handling and provides a structural member which is thermoformable, after removal of the carrier layer 18, to form a thin wall product. The sheet 20 may be of any desired thickness but is commonly from 0.006–0.020 inches thick. The formed product may also be applied, by injection molding or other means, to a thicker substrate to form products such as body or trim panels for automotive vehicles. Compression forming of such sheets is also possible.

Figure 3:
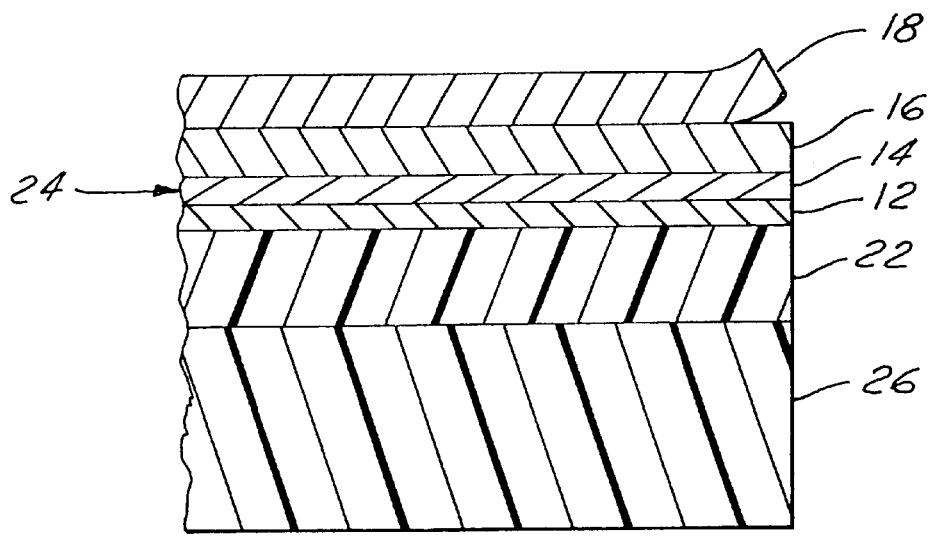
FIG. 3 is a cross-sectional view wherein the laminated sheet of FIG. 2 is shown laminated to a thick wall thermoplastic sheet.

FIG. 3 shows another use of the thin wall decorative sheet 20 of FIG. 2 to form a thick wall thermoformable decorative sheet generally indicated by numeral 24. Sheet 24 includes the laminated layers 12, 14, 16, 18 and 22 of sheet 20. These are further laminated on the side of the thin wall sheet 22 to a thermoplastic thick wall sheet 26 to form the thick decorative sheet 24. The sheet 24 may be used in any desired manner. It is particularly suitable for compression forming or compression/vacuum forming, as described in the previously mentioned U.S. patent application Ser. No. 08/788,131, to form body or trim panels for vehicles.

The embodiments of FIGS. 1–3 are only examples of the forms which the present invention may take and the uses to which it may be put. Among other alternatives which may be used or developed is the application of the film product 10 if FIG. 1 directly onto a thick wall sheet 26 to form a thick wall decorative sheet. Also, if desired, the carrier layer 18 may be removed, if needed or desired, prior to applying the thin or thick wall sheets to the film layers 12, 14, 16. Also, these layers may be built up in any desired manner with or without a carrier layer.

The second protective layer 18, which may act as a carrier layer, preferably acts to protect the underlayers from damage prior to any type of thermoforming operation. This is particularly important in the case of compression forming in order to prevent surface damage from being pressed into the underlying paint surface during the forming operation. Removing the layer 18 just prior to compression forming carries with it any surface damage that may have occurred and avoids the problem of pressing irregularities from the damage into the paint. The first protective layer remains in place during forming and may remain thereafter to protect the underlying paint film after forming and installation in a vehicle or other product until its delivery to a customer, if desired.

FIG. 4 and FIG. 5 illustrate the use of dual protective film layers with other decorative film products. FIG. 4 shows a decorative film product 40 that includes a colored substrate 42 bonded or laminated to a clear thermoformable plastic outer layer 44 with an optional adhesive layer 46. The substrate 42 is a thermoformable plastic that contains color pigment and/or metal flake. FIG. 5 shows another decorative film product 50, which includes a thermoformable plastic substrate 52, bonded or laminated to a thermoformable plastic color carrier layer 54 and a thermoformable plastic clear outer layer 56. Ordinarily, the substrate 52 is thicker than the color carrier layer 54 and provides mechanical strength. Optional adhesive layers 58, 60 can be used to bond the color carrier layer 54 to the substrate 52 and to the clear outer layer 56, respectively. The two decorative film products 40, 50 include the first 16 and second 18 protective film layers of the decorative film products 10, 20, 24 shown in FIG. 1–3, respectively.

The decorative film products 40, 50 shown in FIG. 4 and 5 are typically manufactured using multi-layer coextrusion or traditional lay-up methods. In multi-layer coextrusion, individual components of the decorative film products 40, 50 are fed, usually in pellet form, to separate extruders. The extruders melt the components and feed a common block. The common block brings the components of the decorative film products 40, 50 together, and adjusts initial layer thickness. In a subsequent step, the various layers are laminated under heat and pressure to a requisite thickness. In traditional lay-up methods, the various layers that comprise the decorative film products 40, 50 are formed separately, disposed on one another, and laminated under heat and pressure. For details of multi-layer coextrusion, see co-pending U.S. patent application Ser. No. 09/019,760, filed Feb. 6, 1998, which herein is incorporated by reference.

The decorative film products 40, 50 shown in FIG. 4 and 5 can also be manufactured using a combination of multi-layer coextrusion and traditional lay-up methods. For example, if the second protective layer 18 is not thermoformable, the other layers of the decorative film products 40, 50 can be formed by multi-layer coextrusion. The resulting sheet is then removably fixed to the second protective layer 18. Similarly, the first 16 and second 18 protective layers can be separately formed, and then laminated to the other layers of the decorative film products 40, 50, which are formed by multi-layer coextrusion.

While the invention has been described by reference to various specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A laminated decorative film product useful in the forming of components, the film product comprising:

a sheet of thermoformable decorative material for forming an exterior finish of a component, the decorative material comprised of a clear thermoplastic layer bonded to a colored thermoplastic substrate;

a first protective layer of thermoformable plastic film removably fixed to the clear thermoplastic layer of the decorative material for limiting damage to the decorative material prior to and during subsequent forming operations and thereafter until removed; and a second protective layer of flexible plastic film removably fixed to the first protective layer of thermoformable plastic film for limiting damage to the first protective layer until removal of the second protective layer in advance of forming operations.

2. The invention of claim 1 wherein the second protective layer is a thermoformable plastic film.

3. The invention of claim 1 wherein the second protective layer is a non-thermoformable plastic film.

4. The invention of claim 3 wherein the second protective layer is a polyester film.

5. The invention of claim 3 wherein the second protective layer is a carrier layer on which the first protective layer and the decorative material sheet are formed.

6. The invention of claim 1 further comprising an adhesive layer interposed between the clear thermoplastic layer and the colored thermoplastic substrate.

7. The invention of claim 1 wherein the laminated decorative film product has a thickness in the range of from 0.065 inches to about 0.3 inches over at least half the area of the decorative film product.

8. The invention of claim 1 wherein the clear thermoplastic layer is an exterior surface of the component and the colored thermoplastic substrate is an interior surface of the component.

9. A thermoplastic decorative structural laminated product formable into decorative structural components, the laminated product comprising:

a thermoplastic substrate;

a sheet of thermoformable decorative material for forming an exterior finish of a component, the decorative material comprised of a clear thermoplastic layer bonded to a thermoplastic color carrier layer, wherein the color carrier layer is bonded to the thermoplastic substrate;

a first protective layer of thermoformable plastic film removably fixed to the clear thermoplastic layer of the decorative material for limiting damage to the decorative material prior to and during subsequent forming operations and thereafter until removed; and a second protective layer of flexible plastic film removably fixed to the first protective layer of thermoformable plastic film for limiting damage to the first protective layer until removal of the second protective layer in advance of forming operations.

10. The invention of claim 9 wherein the second protective layer is a thermoformable plastic film.

11. The invention of claim 9 wherein the second protective layer is a non-thermoformable plastic film.

12. The invention of claim 11 wherein the second protective layer is a polyester film.

13. The invention of claim 9, further comprising first and second adhesive layers, the first adhesive layer interposed between the clear thermoplastic layer and the color carrier layer, and the second adhesive layer interposed between the color carrier layer and the thermoplastic substrate.

14. The invention of claim 9 wherein the clear thermoplastic layer is an exterior surface of the component and the thermoplastic substrate is an interior surface of the component.

\* \* \* \* \*